(12) United States Patent
Kim et al.

(10) Patent No.: US 7,397,176 B2
(45) Date of Patent: Jul. 8, 2008

(54) SURFACE LIGHT SOURCE DEVICE AND LIQUID CRYSTAL DISPLAY DEVICE HAVING THE SAME

(75) Inventors: Joong-Hyun Kim, Yongin-si (KR); Hae-Soo Ha, Suwon-si (KR); Sang-Yu Lee, Yongin-si (KR); Seog-Hyun Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 664 days.

(21) Appl. No.: 11/082,498

(22) Filed: Mar. 17, 2005

(65) Prior Publication Data

US 2005/0207139 A1 Sep. 22, 2005

(30) Foreign Application Priority Data

Mar. 17, 2004 (KR) .................... 10-2004-0017822

(51) Int. Cl.
*H01J 1/62* (2006.01)
*H01J 61/30* (2006.01)
*F21V 9/16* (2006.01)

(52) U.S. Cl. ............... 313/493; 313/113; 313/609; 313/573; 313/634; 362/296; 362/215; 362/341

(58) Field of Classification Search ............ None
See application file for complete search history.

(56) References Cited

U.S. PATENT DOCUMENTS

| 4,798,997 | A | * | 1/1989 | Egami et al. | ............... 315/115 |
|---|---|---|---|---|---|
| 5,220,249 | A | * | 6/1993 | Tsukada | ................... 315/246 |
| 5,233,262 | A | * | 8/1993 | Lynn et al. | ................. 313/113 |
| 5,581,152 | A | * | 12/1996 | Matsuno et al. | ............ 313/634 |
| 5,592,047 | A | * | 1/1997 | Park et al. | ................... 313/484 |
| 6,858,979 | B2 | * | 2/2005 | Park et al. | ................... 313/495 |
| 7,157,840 | B2 | * | 1/2007 | Fujishima et al. | .......... 313/112 |
| 2002/0105259 | A1 | * | 8/2002 | Kim | ......................... 313/491 |
| 2004/0119418 | A1 | * | 6/2004 | Moon | ..................... 315/169.3 |

* cited by examiner

*Primary Examiner*—Ashok Patel
(74) *Attorney, Agent, or Firm*—Cantor Colburn LLP (57) ABSTRACT

A surface light source device includes a light source body, first and second electrodes, a light reflecting layer, and a fluorescent layer. The light source body is configured to generate light. The first and second electrodes are each disposed adjacent to a corresponding opposite end portion of the light source body. The first and second electrodes receive a discharge voltage that creates a potential difference across the light source body. The light reflecting layer is disposed at an internal surface of the light source body. The light reflecting layer includes light diffusing particles having at least two sizes. The fluorescent layer is disposed at selected regions of the light source body. Therefore, the light reflecting layer is not deformed by heat and enhances reflectivity without changing a color coordinates.

23 Claims, 7 Drawing Sheets

SURFACE LIGHT SOURCE DEVICE AND LIQUID CRYSTAL DISPLAY DEVICE HAVING THE SAME

BACKGROUND OF THE INVENTION

1. Field of the Invention

The present invention relates to a surface light source device and a liquid crystal display device having the surface light source device. More particularly, the present invention relates to a surface light source device capable of enhancing a luminance and a liquid crystal display device having the surface light source device.

2. Description of the Related Art

Generally, a liquid crystal display (LCD) device displays an image by varying an optical transmittance of liquid crystal. The LCD device has many advantages, which make the LCD device popular for use in various fields. Some examples of advantages of the LCD device include a thin thickness, a lightweight, a low power consumption, a low driving voltage, etc.

The LCD device includes a liquid crystal display panel that converts light into images, and a light source device that provides the liquid crystal display panel with light. A conventional light source device employs a cold cathode fluorescent lamp (CCFL) that has a cylindrical shape. The conventional light source device is classified as either an edge illumination type or direct illumination type according to a position of the CCFL.

In the edge illumination type light source device, the CCFL is disposed at a side portion of a light guide plate, so that light generated from the CCFL enters the light guide plate through a side face of the light guide plate. Light then exits the light guide plate through an upper face of the light guide plate.

In the direct illumination type, a plurality of CCFLs are disposed below the liquid crystal display panel, and a diffusion plate is disposed between the CCFLs and the liquid crystal display panel.

Use of either the light guide plate or the diffusion plate decreases light utilization efficiency of the convention light source device. Additionally, use of either the light guide plate or the diffusion plate increases manufacturing cost for the LCD device, and uniformity of luminance is still low.

In order to solve above-mentioned problems, a surface light source device has been developed. The surface light source device includes a light source body and electrodes. The light source body has an internal space divided into discharge spaces. The electrodes receive a discharge voltage that creates a potential difference across the light source body, which is sufficient to induce an electrical discharge of a discharge gas in the discharge spaces. The discharge spaces are connected to each other so that the discharge gas is uniformly distributed in the discharge spaces. The electrical discharge of the discharge gas generates ultraviolet light that may be converted into visible light.

The surface light source device includes a light reflecting layer formed in the light source body. The light reflecting layer reflects light toward the liquid crystal display panel. Generally, the light reflecting layer includes, but is not limited to, polyethylene terephthalate (PET) or metal.

Manufacturing processes for the surface light source device include a process performed at a temperature higher than about 500 F. At such a high temperature, when the light reflecting layer is formed in the light source body, the light reflecting layer may be deformed by heat during the manufacturing process. Such heat deformation may prevent the light reflecting layer from operating normally. Thus it is desirable to produce a light reflecting layer that is not deformed by heat and has a high reflectivity.

SUMMARY OF THE INVENTION

The present invention provides a surface light source device having a light reflecting layer capable of enhancing reflectivity without changing color coordinates. The present invention also provides a liquid crystal display device having the above-mentioned surface light source device.

In an exemplary light source device according to the present invention, the light source device includes a light source body, first and second electrodes, a light reflecting layer, and a fluorescent layer. The light source body is configured to generate light. The first and second electrodes are each disposed adjacent to a corresponding opposite end portion of the light source body. The first and second electrodes receive a discharge voltage that creates a potential difference across the light source body. The light reflecting layer is disposed at an internal surface of the light source body. The light reflecting layer includes light diffusing particles having at least two sizes. The fluorescent layer is disposed at selected regions of the light source body.

In an exemplary liquid crystal display device according to the present invention, the liquid crystal display device includes a surface light source device, a receiving container and a liquid crystal display panel. The surface light source device includes a light source body having a plurality of discharge spaces, first and second electrodes each disposed adjacent to a corresponding opposite end portion of the light source body, and a light reflecting layer disposed at an inner surface of the light source body. The light reflecting layer has light diffusing particles having at least two sizes. The receiving container receives the surface light source body. The liquid crystal display panel displays images using light generated by the surface light source device.

Therefore, the light reflecting layer is not deformed by heat and enhances reflectivity without altering a color coordinates.

This application relies for priority upon Korean Patent Application No. 2004-17822 filed on Mar. 17, 2004, the contents of which are herein incorporated by reference in its entirety.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the embodiments of the present invention will be described in detail with reference to the accompanied drawings.

Figure 1:
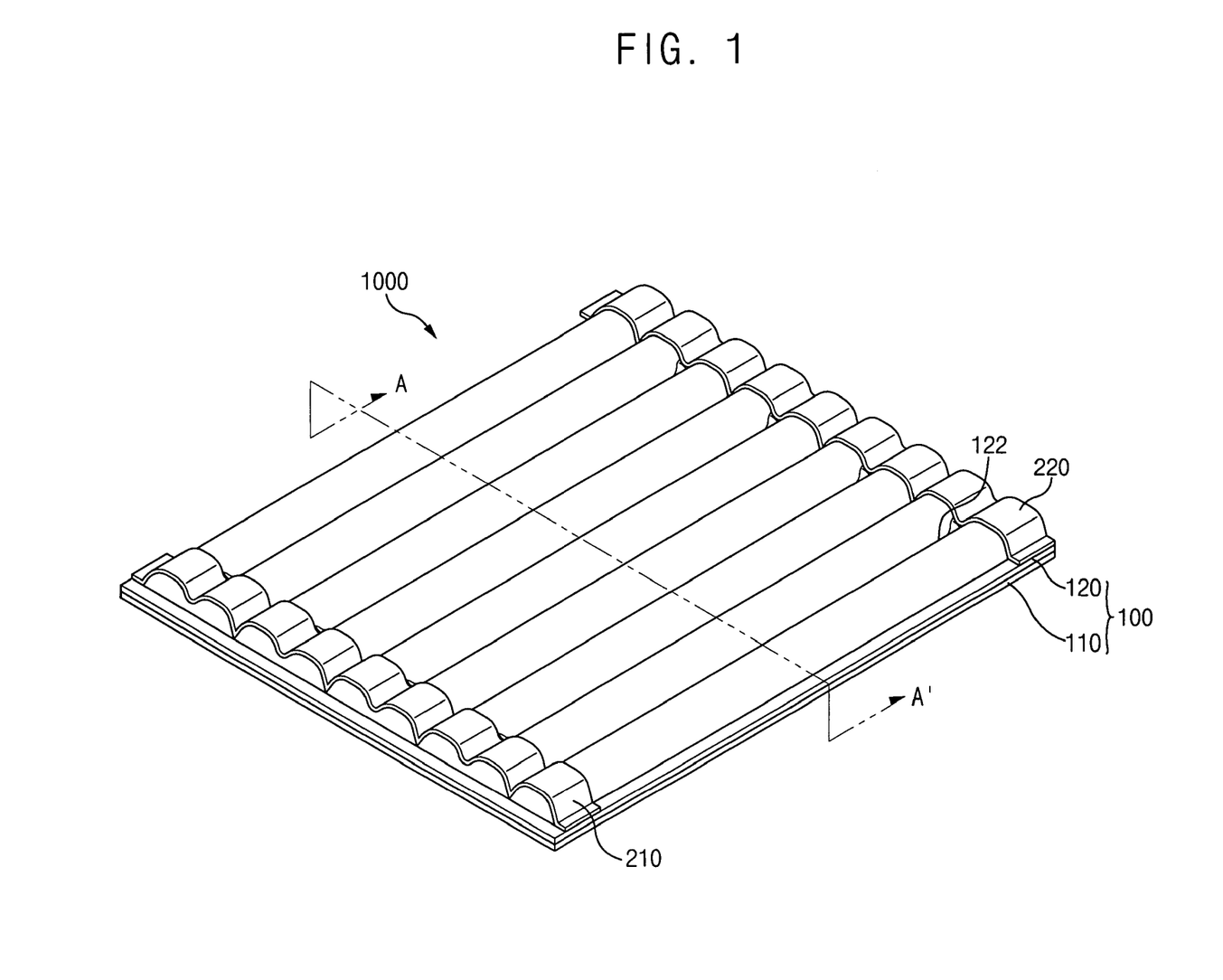
FIG. 1 is a perspective view illustrating a surface light source device according to an exemplary embodiment of the present invention.
Figure 2:
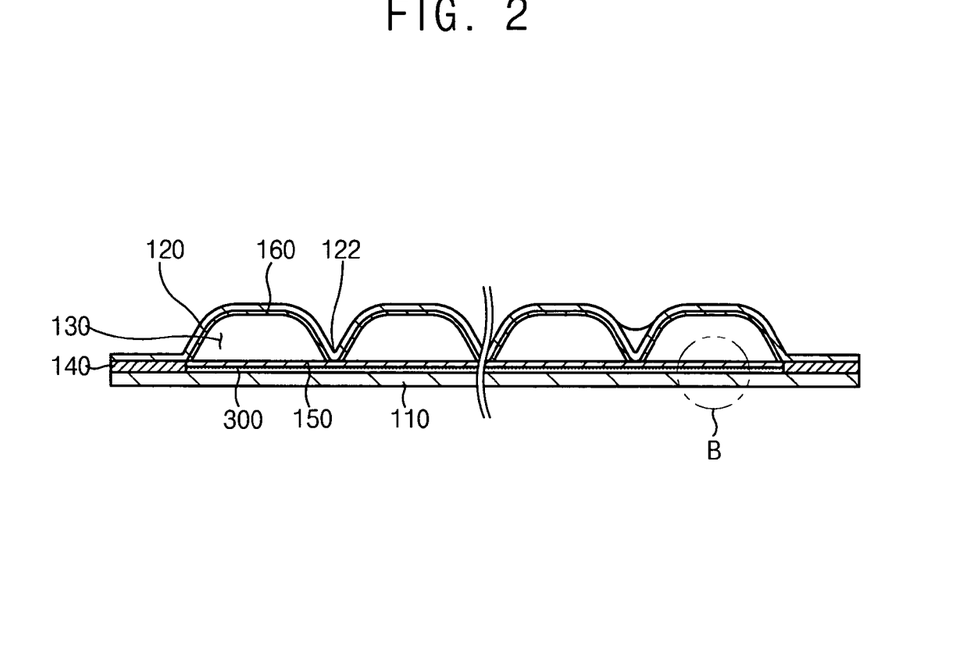
FIG. 2 is a cross-sectional view taken along line I-I' in FIG. 1.
Figure 3:
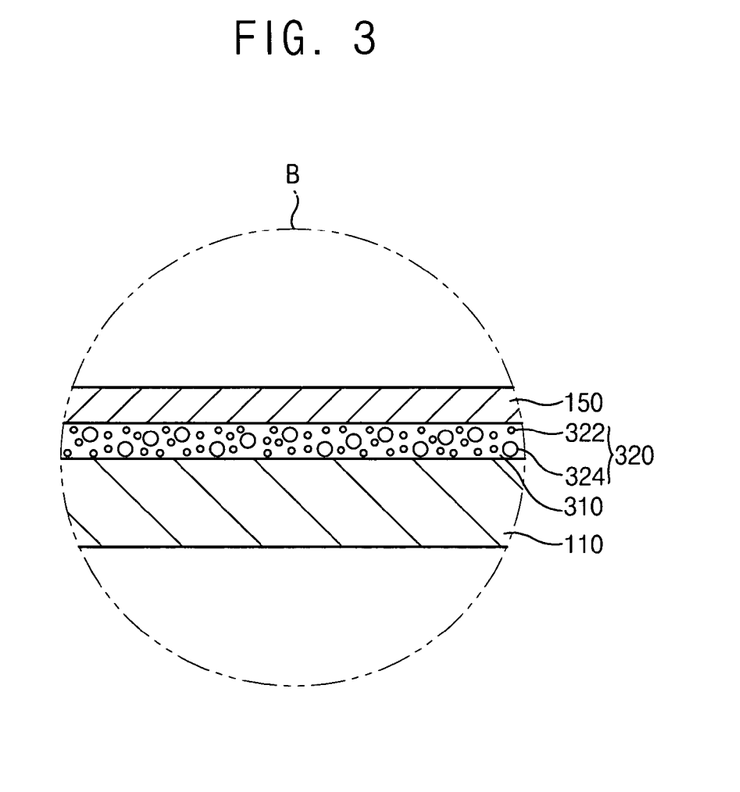
FIG. 3 is an enlarged view illustrating a portion 'B' in FIG. 2.

FIG. 1 is a perspective view illustrating a surface light source device according to an exemplary embodiment of the present invention. FIG. 2 is a cross-sectional view taken along line I-I' in FIG. 1. FIG. 3 is an enlarged view illustrating portion 'B' in FIG. 2.

Referring to FIGS. 1, 2 and 3, a surface light source device 1000 according to an exemplary embodiment of the present invention includes a light source body 100, a first electrode 210, a second electrode 220 and a light reflecting layer 300. Light is generated by the light source body 100. A discharge voltage is applied to the first and second electrodes 210 and 220 to create a potential difference across the light source body 100, which is sufficient to induce an electrical discharge of a discharge gas. The light reflecting layer 300 is disposed in the light source body 100.

The light source body 100 includes a first substrate 110 and a second substrate 120 that is combined with the first substrate 110 to form an internal space. The first substrate 110 has a rectangular plate shape corresponding to, for example, a glass substrate that transmits visible light and blocks ultraviolet light.

The second substrate 120 is combined with the first substrate 110 to form the internal space. The first and second substrates 110 and 120 may each be, for example, the glass substrate that transmits visible light and blocks ultraviolet light. The second substrate 120 includes furrows 122 that are depressed portions of the second substrate 120. The furrows 122 combine with the first substrate 110 to divide the internal space into discharge spaces 130. In other words, the internal space defined by the first and second substrates 110 and 120 is divided into discharge spaces 130 defined by the furrows 122. The furrows 122 are spaced apart from each other and extend in a longitudinal direction substantially parallel to each other. The furrows 122 may be formed, for example, through a "forming process". In the forming process, for example, a flat base substrate is heated and compressed by molding to form the second substrate 120 having the furrows 122.

A cross-section of the surface light source device 1000 taken along a virtual line that is substantially perpendicular to the longitudinal direction of the furrows 122 illustrates the discharge spaces 130 as each having a trapezoidal shape including rounded apexes, as shown in FIG. 2. Alternatively, a cross-section of each discharge space 130 may have a semicircular shape, a rectangular shape, etc.

The second substrate 120 is combined with the first substrate 110 through an adhesive 140, for example, a melted lead glass. For example, the adhesive 140 is disposed along side portions of the first and second substrates 110 and 120, and heat-treated to combine the first and second substrates 110 and 120 with each other. As described above, the adhesive 140 is only disposed at side portions of the first and second substrates 110 and 120. Therefore, the furrows 122 of the second substrate 120 only make contact with the first substrate 110, and the furrows 122 are not adhered by the adhesive 140.

The furrows 122 of the second substrate 120 are compressed toward the first substrate 110 due to a pressure difference between inside and outside the light source body 100. For example, discharge gas for electrical discharge is introduced into the discharge spaces 130 defined by the first and second substrates 110 and 120. An internal pressure of the discharge gas in the discharge spaces 130 is about 50 torr. Since atmospheric pressure is about 760 torr, the first and second substrates 110 and 120 are tightly combined with each other by the pressure difference. Thus, the furrows 122 are also compressed toward the first substrate 110.

The first and second electrodes 210 and 220 are each disposed adjacent to a corresponding opposite end portion of the light source body, such that a longitudinal direction of the first and second electrodes 210 and 220 is substantially perpendicular to a longitudinal direction of the furrows 122. In other words, the longitudinal direction of the first and second electrodes 210 and 220 is substantially perpendicular to the longitudinal direction of the discharge spaces 130.

The first and second electrodes 210 and 220 may be formed by spraying metal powder having good electrical conductivity at the corresponding opposite end portion of the second substrate 120. Examples of the metal powder include copper (Cu), nickel (Ni), silver (Ag), gold (Au), aluminum (Al), chromium (Cr), etc. The metal power may also include a mixture of any of the above mentioned examples of the metal powder. Alternatively, the first and second electrodes 210 and 220 may be formed by attaching an aluminum tape or coating a silver paste to the corresponding opposite end portion of the second substrate 120. Furthermore, corresponding opposite end portions of the light source body 100 may be dipped in melted conductive material to form the first and second electrodes 210 and 220.

The first and second electrodes 210 and 220 are formed such that the first and second electrodes 210 and 220 have sufficient area to allow application of the discharge voltage to produce the potential difference across the light source body 100 that is sufficient to cause the electrical discharge of the discharge gas. In other words, high energy may be applied to the light source body 100 through the first and second electrodes 210 and 220.

According to the present embodiment, the first and second electrodes 210 and 220 are disposed, for example, only at a surface of the second substrate 120. Alternatively, the first and second electrodes 210 and 220 may be disposed at a surface of the first substrate 110 or at surfaces of both the first and second substrates 110 and 120.

The light reflecting layer 300 is disposed in the light source body 100. The light reflecting layer 300 reflects a light generated by the light source body 100 toward the second substrate 120. The light reflecting layer 300 is formed on an internal surface of the first substrate 110. The internal surface of the first substrate 110 faces the second substrate 120. The light reflecting layer 300 may not be formed on a region where the adhesive 140 is disposed.

The light reflecting layer 300 includes a resin 310 coated on the internal surface and light diffusing particles 320 disposed within the resin 310. The light diffusing particles 320 disposed within the resin 310 have at least two sizes. The resin 310 corresponds to thermally curable plastic that is hardened by heat or light-curable plastic that is hardened by light. The resin 310 having the light diffusion particles 320 mixed therewith is coated on the first substrate 110. The light diffusing particles 320 may have a spherical shape. The light diffusing particles 320 are randomly distributed in the resin 310 such that light is reflected toward all directions at a surface of the light diffusing particles 320. Light is continuously reflected until all the light exits the light reflecting layer 300.

In the present embodiment, the light diffusing particles 320 include an oxidized substance. Examples of the oxidized substance include $Al_2O_3$, $SiO_2$, $MgO$, $BaSO_4$, $TiO_2$, etc. The light diffusing particles 320 include, for example, a metal oxide that is heat resistant. In this exemplary embodiment, the light diffusing particles 320 include $Al_2O_3$, which has good optical transmittance properties for light having a wavelength in a range of about 200 nm to about 700 nm.

A reflectivity of the light reflecting layer 300 is determined by Expression 1 below. Expression 1 relates to a reflectivity of the powder layer. Expression 1 is disclosed in page 767 of 'Phosphor Handbook (Shigeo Shionoya, CRC Press Washington D.C.)'.

$$K/S=(1-R)^2/(2R),$$ Expression 1

Wherein 'K' represents an absorption coefficient, 'S' represents a scattering coefficient, 'R' represents a reflectivity when a powder layer thickness is infinity. In other words, 'R' corresponds to a maximum reflectivity.

According to Expression 1, as the absorption coefficient 'K' decreases and the scattering coefficient 'S' increases, the reflectivity approaches one. Therefore, in order to get maximum reflectivity, the scattering coefficient 'S' must be a maximum value. Generally, when a diameter of particles is in a range from about 1 μm to about 10 μm, as the diameter of the particles decreases, a density of the particles increases. As the diameter of the particles decreases, the scattering coefficient 'S' increases, thus a majority portion of light is scattered in a direction that is not much different from the direction at which the light approached the particles. Additionally, when the diameter of the particles is larger than about 1 μm, the scattering coefficient 'S' is no longer dependent on light wavelength. However, when the diameter of the particles is less than about 1 μm, although the scattering coefficient 'S' increases, the scattering coefficient 'S' is dependent on light wavelength.

In other words, although reducing the diameter of the particles improves scattering characteristics, reducing the diameter of the particles also increases dependence on light wavelength so that color coordinates are changed. Therefore, a balance must be made between dependence on light wavelength and scattering characteristics including amount and direction of scattering.

To achieve the balance, according to the present invention, in order to get maximum scattering coefficient 'S' while minimizing dependence on light wavelength to minimize change of color coordinates, the light reflecting layer 300 includes light diffusing particles 320 having at least two sizes. For example, a size of a majority of particles is reduced in order to enhance reflectivity, and a minority of particles have a size larger than that of the majority of particles to reduce dependence on light wavelength.

For example, the light diffusing particles 320 include first particles 322 and second particles 324. The first particles 322 have a first diameter, and the second particles 324 have a second diameter that is larger than the first diameter. For example, the first diameter is less than about 1 μm in order to increase the scattering coefficient 'S' and thereby enhance reflectivity, and the second diameter is equal to or more than about 1 μm in order to reduce the change of color coordinates. For example, when the light diffusing particles 320 include $Al_2O_3$, a coated amount of the light reflecting layer 300 is in a range of about 5 mg/cm$^2$ to about 12 mg/cm$^2$, which corresponds to a thickness of the light reflecting layer 300 of about 20 μm to about 100 μm.

Reflectivity and change of color coordinates of the light reflecting layer 300 also depend on a weight ratio of the first and second particles 322 and 324. Table 1 below shows a relationship between the reflectivity and the weight ratio of the first and second particles 322 and 324, and a relationship between the change of color coordinates and the weight ratio of the first and second particles 322 and 324. In an experiment relating Table 1, the first particles 322 having a diameter of about 0.5 μm and the second particles 324 having a diameter of about 1.1 μm were used.

In Sample 1, the weight ratio of the first and second particles 322 and 324 was 100:0. In Sample 2, the weight ratio of the first and second particles 322 and 324 was 70:30. In Sample 3, the weight ratio of the first and second particles 322 and 324 was 50:50. In Sample 4, the weight ratio of the first and second particles 322 and 324 was 0:100. A light having about a 500 nm wavelength was irradiated onto Samples 1 through 4, and the reflectivity was measured by a UV-visible spectrometer.

TABLE 1

|  | Coated amount (mg/cm$^2$) | | | | Amount of change of |
| --- | --- | --- | --- | --- | --- |
|  | 5 | 7 | 10 | 12 | color coordinates |
| Sample 1 | 92 | 95 | 97 | 98 | Δx: 0.020, Δy: 0.024 |
| Sample 2 | 90 | 94 | 97 | 98 | Δx: 0.010, Δy: 0.012 |
| Sample 3 | 89 | 90 | 93 | 95 | Δx: 0.011, Δy: 0.013 |
| Sample 4 | 85 | 88 | 90 | 95 | Δx: 0.010, Δy: 0.013 |

Referring to Table 1, when the weight ratio of the first particles 322 having smaller diameter than that of the second particles 324 increased, the reflectivity was enhanced. Additionally, when a coated amount increased, the reflectivity was also enhanced. On the other hand, an amount of change of color coordinates in Sample 1 having only first particles 322 was much greater than that in other Samples having second particles 324. Therefore, Samples 2 and 3 were preferable since the reflectivity was high while the amount of change of color coordinates was small. In other words, a preferable weight ratio of the first particles 322 and the second particles 324 was in a range of about 5:5 to about 8:2. A most preferable weight ratio of the first particles 322 and the second particles 324 was about 7:3.

The surface light source device 1000 further includes a first fluorescent layer 150 and a second fluorescent layer 160 disposed in the light source body 100. The first fluorescent layer 150 is disposed at the light reflecting layer 300 of the first substrate 110. The second fluorescent layer 160 is disposed at an internal surface of the second substrate 120. The internal surface of the second substrate 120 faces the first substrate 110. The first and second fluorescent layers 150 and 160 convert ultraviolet light generated by the electrical discharge of the discharge gas into visible light.

A first protection layer (not shown) may be disposed between the first substrate 110 and the light reflecting layer 300. A second protection layer (not shown) may be disposed between the second substrate 120 and the second fluorescent layer 160. The first and second protection layers prevent a chemical reaction between mercury gas of the discharge gas and the first and second substrates 110 and 120, respectively.

The surface light source device 1000 includes a connection path that connects the discharges spaces 130 with each other, so that the discharge gas introduced into one of the discharge spaces 130 is uniformly distributed in the discharge spaces 130.

Figure 4:
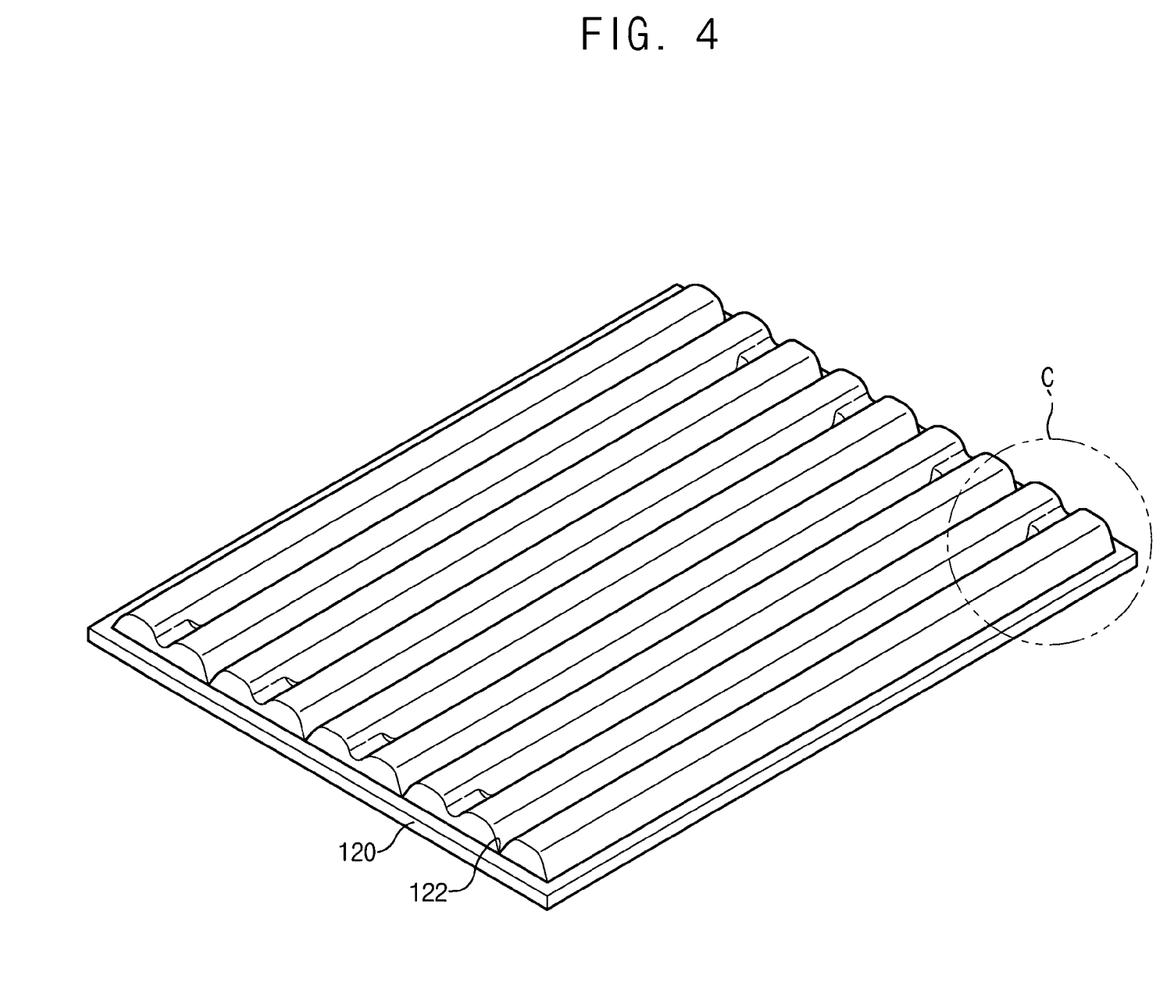
FIG. 4 is a perspective view illustrating a second substrate of FIG. 1.
Figure 5:
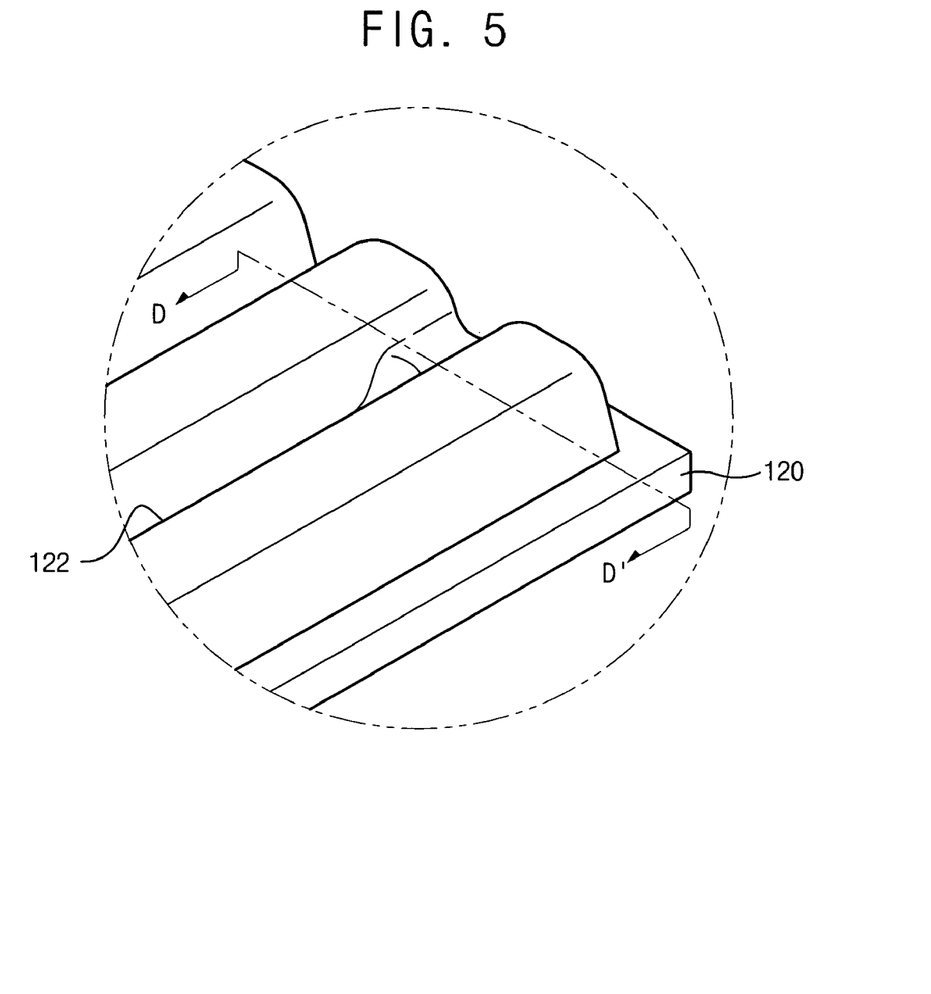
FIG. 5 is an enlarged view illustrating a portion 'C' in FIG. 4.

FIG. 4 is a perspective view illustrating the second substrate 120 of FIG. 1. FIG. 5 is an enlarged view illustrating portion 'C' in FIG. 4, and FIG. 6 is a cross-sectional view taken along line II-II' in FIG. 5.

Figure 6:
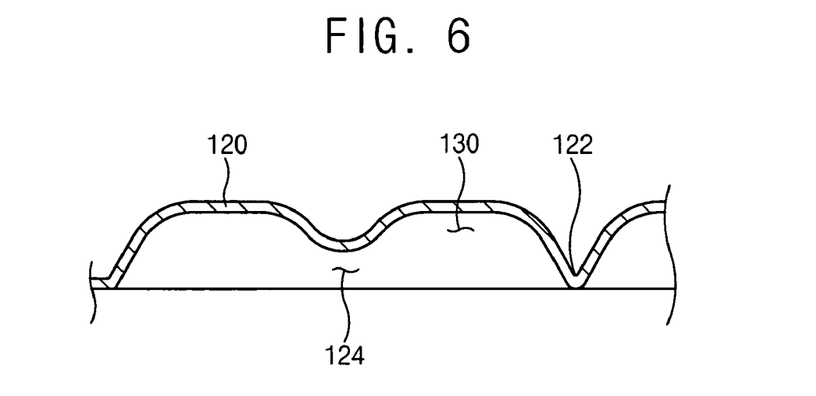
FIG. 6 is a cross-sectional view taken along line II-II' in FIG. 5.

Referring to FIGS. 4, 5 and 6, the second substrate 120 includes furrows 122 that define discharge spaces 130. The second substrate 120 having the discharge spaces 130 may be formed, for example, through the "forming process". During the forming process, for example, a flat base substrate is heated and compressed by molding to form the second substrate 120 having the furrows 122.

Each furrow 122 includes a connection path 124. The connection path 124 is spaced apart from the first substrate 110, so that the connection path 124 connects the discharges spaces 130 to each other. A number of connection paths 124 corresponds to a number of furrows 122. Each furrow 122 includes at least one of the connection paths 124. The connection paths 124 are, for example, alternately formed. In other words, the connection paths 124 are formed adjacent to a first end portion of odd numbered furrows 122, and the connection paths 124 are formed adjacent to a second end portion of even numbered furrows 122. While forming each furrow 122, a depth of a portion of the furrow 122 is shallower than a depth of other portions of the furrow 122 to form the connection path 124. Thus, discharge gas introduced into one of the discharge spaces 130 is uniformly distributed in the discharge spaces 130 via the connection paths 124. The connection paths 124 may alternatively be formed at the light reflecting layer 300 or the first fluorescent layer 150 of the first substrate 110. For example, the furrows 122 of the second substrate 120 have a same depth throughout all portions of the furrows 122, and a portion of the first fluorescent layer 150 and the light reflecting layer 300 is recessed to form the connection paths 124 that connect the discharge spaces 130 to each other.

The connection paths 124 are formed such that a longitudinal direction of the connection paths 124 is substantially perpendicular to a longitudinal direction of the discharge spaces 130. In other words, the longitudinal direction of the connection paths 124 is substantially perpendicular to the longitudinal direction of the furrows 122. The first fluorescent layer 150 or the light reflecting layer 300 may be partially removed to form the connecting paths 124. Alternatively, a portion of the first substrate 110 may have thinner thickness than other portions of the first substrate 110 to form the connection paths 124.

Figure 7:
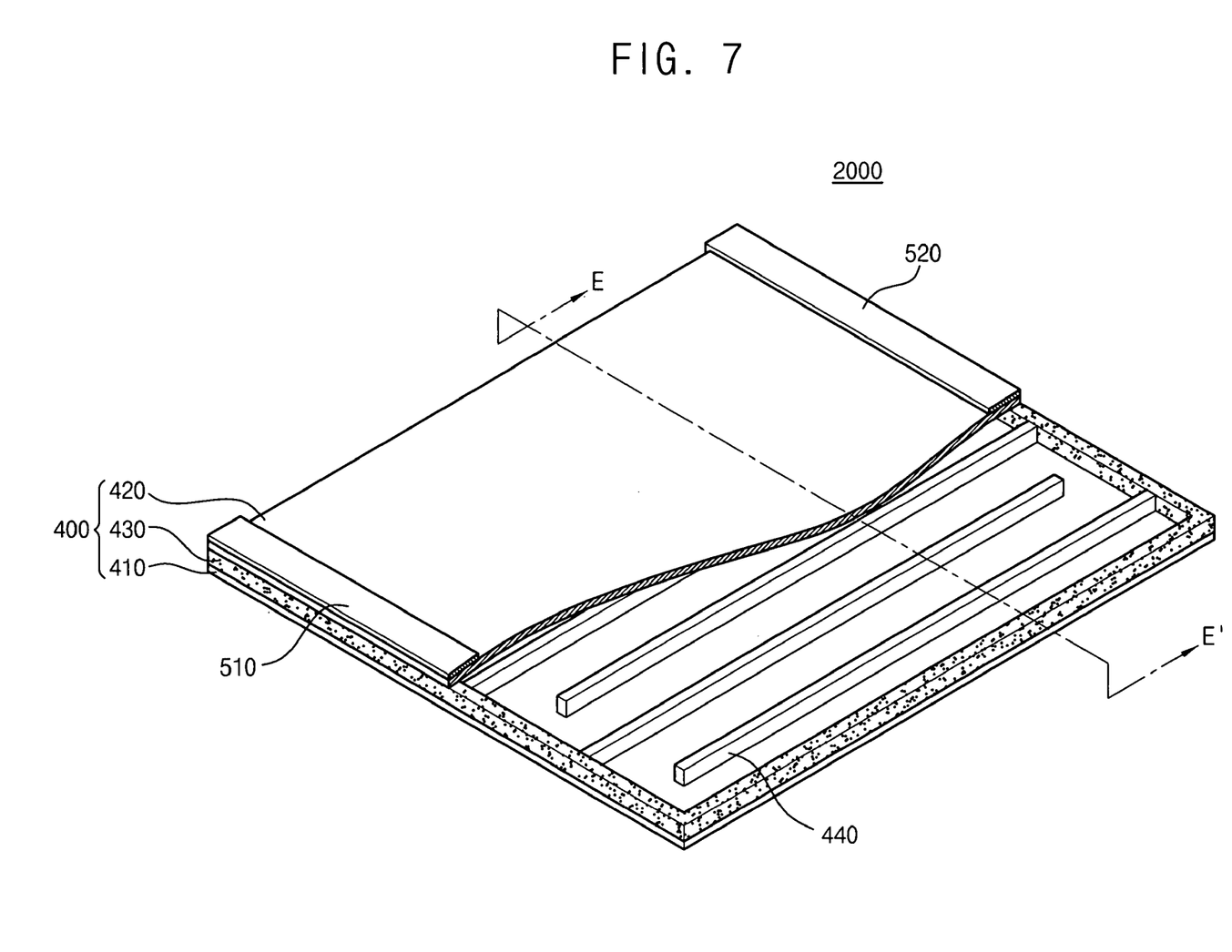
FIG. 7 is a partially cutout perspective view illustrating a surface light source device according to another exemplary embodiment of the present invention.
Figure 8:
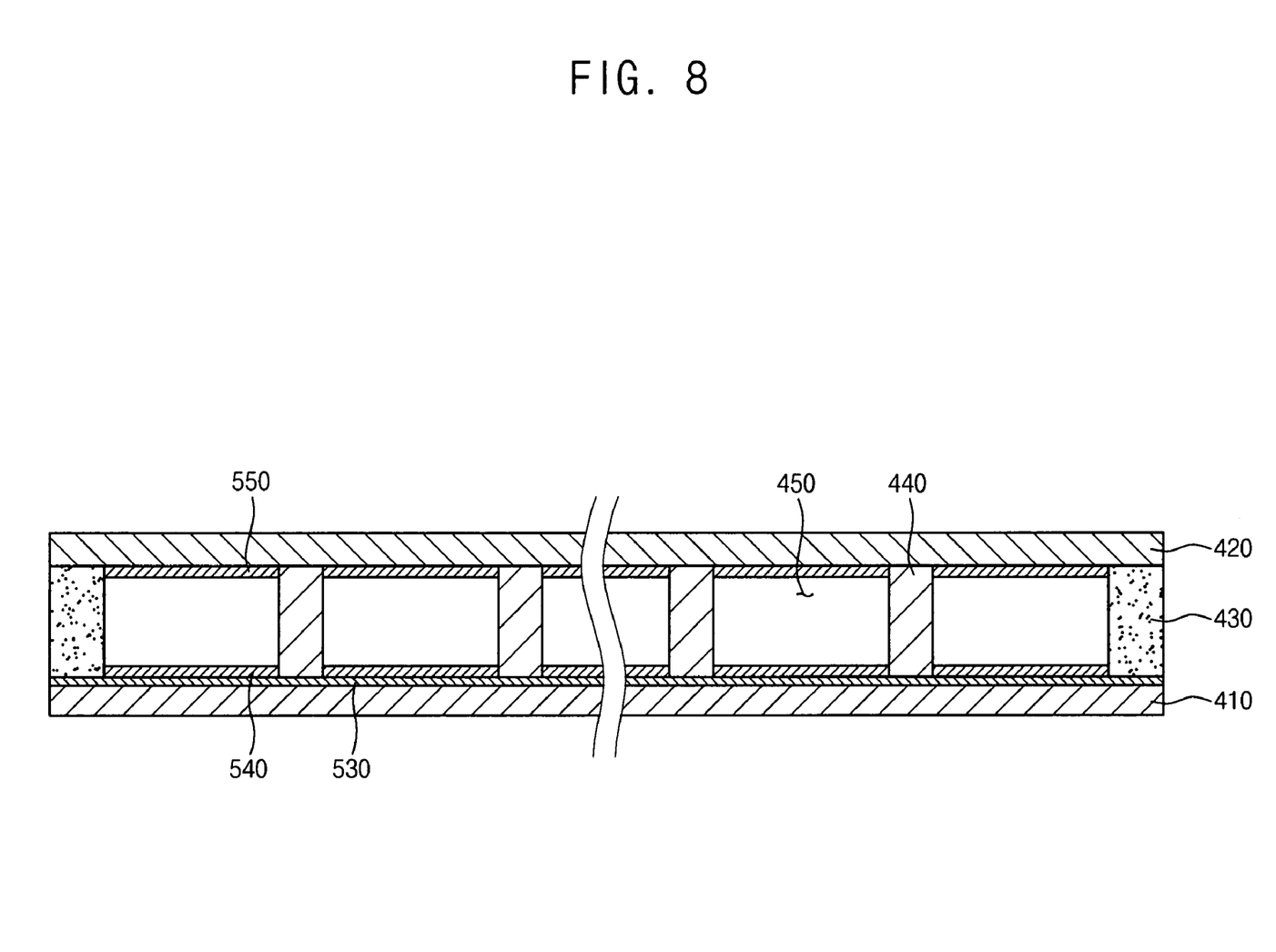
FIG. 8 is a cross-sectional view taken along line III-III' in FIG. 7.

FIG. 7 is a partially cutout perspective view illustrating a surface light source device according to another exemplary embodiment of the present invention, and FIG. 8 is a cross-sectional view taken along line III-III' in FIG. 7.

The surface light source device 2000 according to the present embodiment includes a light source body 400, a first electrode 510, a second electrode 520 and a light reflecting layer 530. The first and second electrodes 510 and 520 are each disposed adjacent to a corresponding opposite end portion of the light source body 400. The light reflecting layer 530 is disposed in the light source body 400.

The light source body 400 includes a first substrate 410, a second substrate 420 spaced apart from the first substrate 410 and facing the first substrate 410, and a sealing member 430 disposed between the first and second substrates 410 and 420 along edge portions of the first and second substrates 410 and 420 to define an internal space. The first and second substrates 410 and 420 may include glass that transmits visible light and blocks ultraviolet light.

The light source body 400 further includes partition members 440 disposed in the internal space. The partition members 440 divide the internal space to define discharge spaces 450. The partition members 440 are disposed substantially parallel to each other and spaced apart from each other by a predetermined distance. Upper portions of the partition members 440 make contact with the second substrate 420, and lower portions of the partition members 440 make contact with the first substrate 410. Each partition member 440 has a rod shape and has a first end and a second end. At least one of the first and second ends is spaced apart from the sealing member 430, so that the discharge spaces 450 are connected to each other. Therefore, when discharge gas is injected into one of the discharge spaces 450, the discharge gas is uniformly distributed in the discharge spaces 450.

The partition members 440 and the sealing member 430 may include different material from each other. Alternatively, the partition members 440 and the sealing member 430 may be simultaneously formed with a same material through a same procedure.

The first and second electrodes 510 and 520 are disposed at a surface of the light source body 400 such that the first and second electrodes 510 and 520 are disposed at first and second end portions of the light source body 400, respectively. The first and second electrodes 510 and 520 are disposed, for example, at an outer surface of the second substrate 420. Alternatively, the first and second electrodes 510 and 520 may be disposed at an outer surface of the first substrate 410, or at outer surfaces of both the first and second substrates 410 and 420.

The light reflecting layer 530 is disposed at an internal surface of the first substrate 410. The internal surface of the first substrate 410 faces the second substrate 420. The light reflecting layer 530 may cover all portions of the internal surfaces of the first substrate 420. Alternatively, the light reflecting layer 530 may cover a first region of the internal surfaces of the first substrate 420, and the light reflecting layer 530 may not cover a second region at which the sealing member 430 is disposed. The light reflecting layer 530 has substantially the same structure as that of the light reflecting layer 300 in FIG. 3, therefore, any further explanation will be omitted.

The surface light source device 2000 further includes first and second fluorescent layers 540 and 550. The first and second fluorescent layers 540 and 550 are disposed at the internal surfaces of the first and second substrates 410 and 420, respectively. The first and second fluorescent layers 540 and 550 are not disposed in a region to which the partition members 440 are attached. Alternatively, another fluorescent layer may be disposed at side surfaces of the partition members 440. The first and second fluorescent layers 540 and 550 receive ultraviolet light generated by the electrical discharge of the discharge gas, and emit visible light.

The surface light source device 2000 may further include a protection layer (not shown) disposed between the first substrate 410 and the light reflecting layer 530 or between the second substrate 420 and the second fluorescent layer 550. The protection layer prevents a chemical reaction between the first and second substrates 410 and 420, and the discharge gas.

Figure 9:
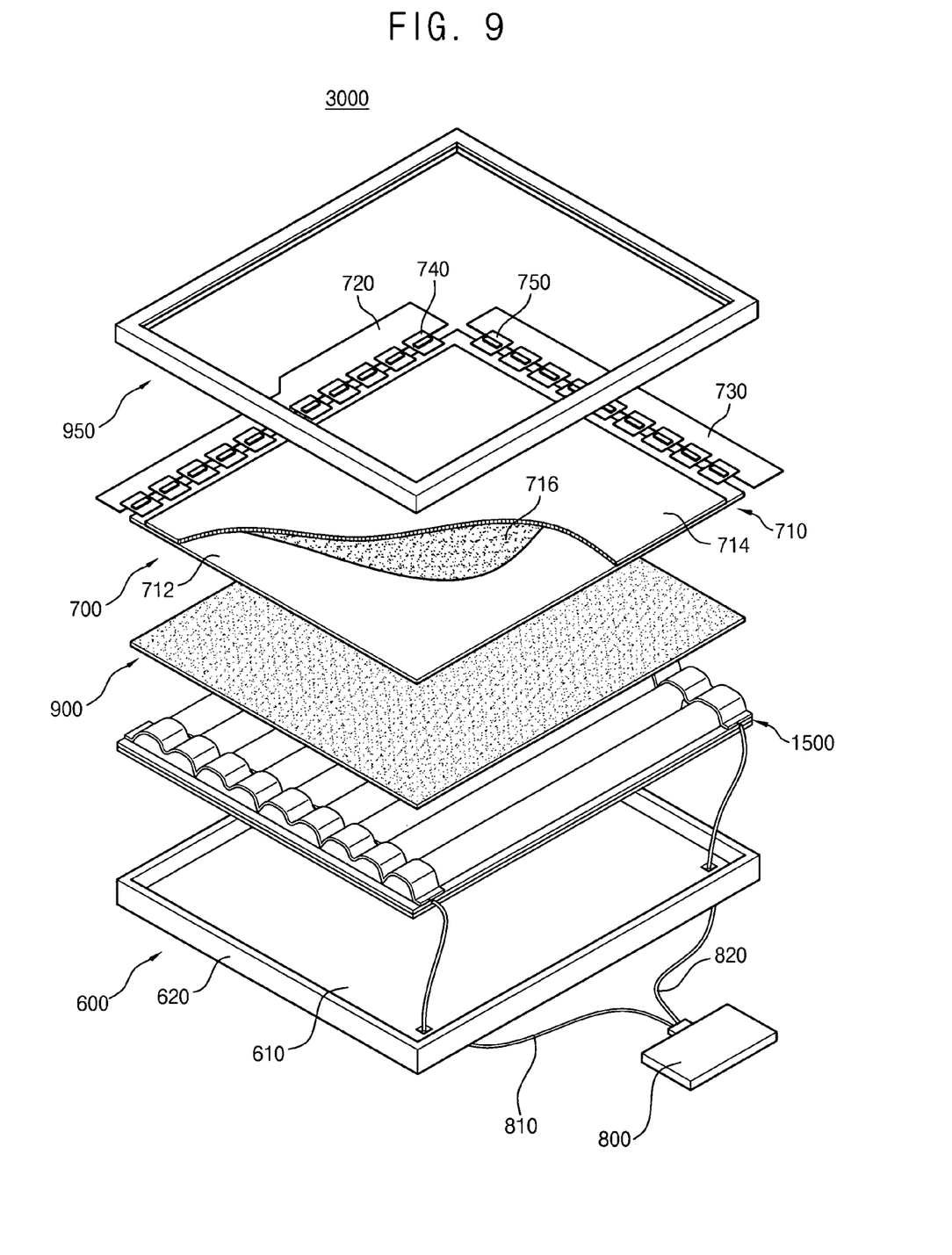
FIG. 9 is an exploded perspective view illustrating a liquid crystal display device according to an exemplary embodiment of the present invention.

FIG. 9 is an exploded perspective view illustrating a liquid crystal display device according to an exemplary embodiment of the present invention.

Referring to FIG. 9, the liquid crystal display (LCD) device 3000 according to the present embodiment includes a surface light source device 1500, a receiving container 600 and a display unit 700. According to the present embodiment, the surface light source device 1500 may employ any one of previously discussed embodiments corresponding to FIGS. 1 through 8. Therefore, a further explanation of the surface light source device 1500 will be omitted.

The display unit 700 includes a liquid crystal display panel 710, a data printed circuit board 720 and a gate printed circuit board 730. The liquid crystal display panel 710 displays images. The data and gate PCBs 720 and 730 provide the liquid crystal display panel 710 with driving signals. The driving signals provided from the data and gate PCBs 720 and 730 are applied to the liquid crystal display panel 710 through a data tape carrier package (TCP) 740 and a gate TCP 750.

The liquid crystal display panel 710 includes a thin film transistor (TFT) substrate 712, a color filter substrate 714 and a liquid crystal layer 716. The TFT substrate 712 and the color filter substrate 714 face each other. The liquid crystal layer 716 is disposed between the TFT substrate 712 and the color filter substrate 714. The TFT substrate 712 has a plurality of TFTs arranged in a matrix shape. Each TFT includes a source electrode that is electrically connected to a data line, a gate electrode that is electrically connected to a gate line, and a drain electrode that is electrically connected to a pixel electrode (not show). The pixel electrode includes an electrically conductive and optically transparent material. The color filter substrate 714 includes red, green and blue (RGB) color filters. The color filter substrate 714 further includes a common electrode (not shown). The common electrode includes an electrically conductive and optically transparent material.

When a gate voltage is applied to the gate electrode of a TFT, the TFT is turned on, so that a data voltage is applied to the pixel electrode. Therefore, electric fields are formed between the pixel electrode and the common electrode to change an arrangement of liquid crystal molecules of the liquid crystal layer 716. Then, a transmissivity of the liquid crystal layer 716 is altered to display images.

The receiving container 600 includes a bottom plate 610 and sidewalls 620. The bottom plate 610 supports the surface light source device 1500. The sidewalls 620 are extended from side portions of the bottom plate 610 to define a receiving space. The sidewalls 620 make contact with side faces of the surface light source device 1500 to prevent movement of the surface light source device 1500.

The LCD device 3000 further includes an inverter 800, an optical member 900 and a top chassis 950. The inverter 800 is on a bottom surface of the receiving container 600. The inverter 800 generates a discharge voltage for driving the surface light source device 1500. The discharge voltage generated from the inverter 800 is applied to the surface light source device 1500 through a first wire 810 and a second wire 820.

The optical member 900 is disposed between the surface light source device 1500 and the liquid crystal display panel 710. The optical member 900 enhances uniformity of luminance of light generated by the surface light source device 1500. The optical member 900 may correspond to a thin film or a thick plate. The optical member 900 may include a prism sheet that enhances luminance.

The top chassis 950 surrounds side portions of the liquid crystal display panel 710 and is combined with the receiving container 600. The top chassis 950 protects the liquid crystal display panel 710 and prevents the liquid crystal display panel 710 from being separated from the receiving container 600.

According to the present invention, the light source body includes the light reflecting layer, which includes light diffusing particles having an oxidized substance. The light diffusing particles have at least two sizes, which are mixed with a specific weight ratio. Therefore, the light reflecting layer is not deformed by heat and enhances reflectivity without changing color coordinates.

Having described the exemplary embodiments of the present invention and its advantages, it is noted that various changes, substitutions and alterations can be made herein without departing from the spirit and scope of the invention as defined by appended claims.

What is claimed is:

1. A light source device comprising:
   a light source body configured to generate light;
   a first electrode and a second electrode each disposed adjacent to a corresponding opposite end portion of the light source body, the first and second electrodes receiving a discharge voltage that creates a potential difference across the light source body;
   a light reflecting layer disposed at an internal surface of the light source body, the light reflecting layer including light diffusing particles having at least two sizes; and
   a fluorescent layer disposed at selected regions of the light source body.

2. The light source device of claim 1, wherein the light reflecting layer includes a resin disposed at the internal surface, the resin including the light diffusing particles.

3. The light source device of claim 1, wherein the light diffusing particles include first particles having a first diameter and second particles having a second diameter that is greater than the first diameter.

4. The light source device of claim 3, wherein the first diameter is less than about 1 μm and the second diameter is equal to or greater than about 1 μm.

5. The light source device of claim 3, wherein a weight ratio of the first and second particles is in a range from about 8:2 to about 5:5.

6. The light source device of claim 5, wherein the weight ratio of the first and second particles is about 7:3.

7. The light source device of claim 1, wherein the light diffusing particles comprise metal oxide.

8. The light source device of claim 1, wherein the light diffusing particles include a compound selected from at least one of aluminum oxide ($Al_2O_3$), silicon dioxide ($SiO_2$), magnesium oxide (MgO), barium sulfate ($BaSO_4$) and titanium oxide ($TiO_2$).

9. The light source device of claim 1, wherein the light diffusing particles comprise aluminum oxide ($Al_2O_3$), and a coated amount of the light reflecting layer is in a range from about 5 mg/cm$^2$ to about 12 mg/cm$^2$.

10. The light source device of claim 1, wherein the light source body comprises:
    a first substrate having the light reflecting layer formed thereon; and
    a second substrate having furrows that divide an internal space formed between the first and second substrates to define discharge spaces.

11. The light source device of claim 9, wherein a portion of each furrow is spaced apart from the first substrate to define a connection path that connects the discharge spaces to each other.

12. The light source device of claim 10, wherein a connection path that connects the discharge spaces to each other is defined by at least one of:
    a partially removed portion of the light reflecting layer;
    a partially removed portion of the fluorescent layer; and
    a portion of the first substrate having a thinner thickness than other portions of the first substrate.

13. The light source device of claim 10, wherein the furrows define the discharge spaces having one of:
    a trapezoidal shape with rounded apexes;
    a semicircular shape; and
    a rectangular shape.

14. The light source device of claim 1, wherein the light source body comprises:

a first substrate having a plate shape;

a second substrate combined with the first substrate to define an internal space between the first and second substrates; and partition members disposed between the first and second substrates to divide the internal space and define discharge spaces.

15. The light source device of claim 14, wherein the light reflecting layer is disposed at an internal surface of the first substrate, and the internal surface faces the second substrate.

16. The light source device of claim 14, wherein the partition members are arranged substantially parallel to each other and spaced apart from each other by a predetermined distance, and at least one end portion of the partition members is spaced apart from a side of the light source body to form a connection path that connects the discharge spaces to each other.

17. The surface light source device of claim 1, wherein the fluorescent layer is disposed at a portion of the inner surface of the light source body and the light reflecting layer.

18. A liquid crystal display device comprising:

a surface light source device including a light source body having a plurality of discharge spaces, a first electrode and a second electrode each disposed adjacent to a corresponding opposite end portion of the light source body, a light reflecting layer disposed at an inner surface of the light source body, and a fluorescent layer disposed at the discharge spaces, the light reflecting layer having light diffusing particles having at least two sizes;

a receiving container that receives the surface light source body; and a liquid crystal display panel that displays images using light generated by the surface light source device.

19. The liquid crystal display device of claim 18, wherein the light reflecting layer is disposed such that light generated from a discharge gas in the discharge spaces is reflected from the light reflecting layer toward the liquid crystal display panel.

20. The liquid crystal display device of claim 18, wherein the light diffusing particles include first particles having a diameter of less than about 1 μm and second particles having a diameter being equal to or greater than about 1 μm.

21. The liquid crystal display device of claim 20, wherein a weight ratio of the first particles to the second particles is in a range from about 8:2 to about 5:5.

22. The liquid crystal display device of claim 18, wherein the light diffusing particles comprise a compound selected from at least one of aluminum oxide ($Al_2O_3$), silicon dioxide ($SiO_2$), magnesium oxide (MgO), barium sulfate ($BaSO_4$) and titanium oxide ($TiO_2$).

23. The liquid crystal display apparatus of claim 18, further comprising:

an inverter that applies a discharge voltage to the first and second electrodes; and an optical member disposed between the surface light source device and the liquid crystal display panel.

* * * * *